(12) United States Patent
Zhou (10) Patent No.: US 7,734,529 B1
(45) Date of Patent: Jun. 8, 2010

(54) TRADER STATION USER INTERFACE

(75) Inventor: Yuan Zhou, Addison, IL (US)

(73) Assignee: Chicago Mercantile Exchange, Inc., Chicago, IL (US)

(*) Notice: Subject to any disclaimer, the term of this patent is extended or adjusted under 35 U.S.C. 154(b) by 1442 days.

(21) Appl. No.: 10/837,818

(22) Filed: May 3, 2004

Related U.S. Application Data (60) Provisional application No. 60/474,035, filed on May 29, 2003.

(51) Int. Cl.
*G06Q 40/00* (2006.01)
(52) U.S. Cl. .................................................. 705/37
(58) Field of Classification Search ............... 705/36 R, 705/37
See application file for complete search history.

(56) References Cited

U.S. PATENT DOCUMENTS

| | | | |
|---|---|---|---|
| 4,674,044 | A | 6/1987 | Kalmus et al. |
| 4,750,135 | A | 6/1988 | Boilen |
| 4,903,201 | A | 2/1990 | Wagner |
| 5,038,284 | A | 8/1991 | Kramer |
| 5,077,665 | A | 12/1991 | Silverman et al. |
| 5,101,353 | A | 3/1992 | Lupien et al. |
| 5,136,501 | A | 8/1992 | Silverman et al. |
| 5,270,922 | A | 12/1993 | Higgins |
| 5,297,031 | A | 3/1994 | Gutterman et al. |
| 5,297,032 | A | 3/1994 | Trojan et al. |
| 5,689,651 | A | 11/1997 | Lozman |
| 5,774,877 | A | 6/1998 | Patterson, Jr. et al. |
| 5,793,301 | A | 8/1998 | Patterson, Jr. et al. |
| 5,797,002 | A | 8/1998 | Patterson, Jr. et al. |
| 5,845,266 | A | 12/1998 | Lupien et al. |
| 5,915,245 | A | 6/1999 | Patterson, Jr. et al. |

(Continued)

FOREIGN PATENT DOCUMENTS

JP    2002175422 A  *  6/2002

(Continued)

OTHER PUBLICATIONS

Kharouf, A Trading Room with a View, Furtures, 27, Nov. 11, 1998, pp. 66-78.

(Continued)

*Primary Examiner*—Charles R Kyle
*Assistant Examiner*—David L Wood
(74) *Attorney, Agent, or Firm*—Banner & Witcoff, Ltd.

(57) ABSTRACT

A variety of user interfaces, systems and methods are provided for traders of commodities, futures contracts, derivatives, stocks, etc. A user interface may have two display modes, locked and unlocked. In the locked mode, some or all of the data fields (price, bids, offers—optionally bids and offers not exposed to the market) are locked. In the unlocked mode, all the data fields, including the price column, are dynamically updated. In a second embodiment, a price column is divided such that prices above the market are in a first column and prices below the market are in a second column to reduce the number of columns required to show bids, offers and prices. Optionally, the trader's bids and offers not exposed to the market can be shown in columns adjacent to the market bids and offers. In a third embodiment of the invention orders are cancelled if the market changes within a short period of time before the order is placed and the change does not benefit the user.

10 Claims, 12 Drawing Sheets

U.S. PATENT DOCUMENTS

| | | | |
|---|---|---|---|
| 5,924,082 | A | 7/1999 | Silverman et al. |
| 5,924,083 | A | 7/1999 | Silverman et al. |
| 5,946,667 | A | 8/1999 | Tull, Jr. et al. |
| 5,963,923 | A | 10/1999 | Garber |
| 6,012,046 | A | 1/2000 | Lupien et al. |
| 6,014,643 | A | 1/2000 | Minton |
| 6,035,287 | A | 3/2000 | Stallaert et al. |
| 6,098,051 | A | 8/2000 | Lupien et al. |
| 6,131,087 | A | 10/2000 | Luke et al. |
| 6,134,535 | A | 10/2000 | Belzberg |
| 6,195,647 | B1 | 2/2001 | Martyn et al. |
| 6,272,474 | B1 | 8/2001 | Garcia |
| 6,278,982 | B1 | 8/2001 | Korhammer et al. |
| 6,282,521 | B1 | 8/2001 | Howorka |
| 6,408,282 | B1 | 6/2002 | Buist |
| 6,766,304 | B2 | 7/2004 | Kemp, II et al. |
| 6,772,132 | B1 | 8/2004 | Kemp, II et al. |
| 7,177,833 | B1 * | 2/2007 | Marynowski et al. ......... 705/38 |
| 2002/0023038 | A1 | 2/2002 | Fritsch et al. |
| 2002/0055899 | A1 | 5/2002 | Williams |
| 2002/0059129 | A1 * | 5/2002 | Kemp et al. ................... 705/37 |
| 2002/0099644 | A1 | 7/2002 | Kemp, III et al. ............. 705/37 |
| 2002/0138401 | A1 * | 9/2002 | Allen et al. .................... 705/37 |
| 2002/0171691 | A1 * | 11/2002 | Currans et al. ............... 345/864 |
| 2003/0009411 | A1 * | 1/2003 | Ram et al. ..................... 705/37 |
| 2003/0023542 | A1 | 1/2003 | Kemp, III et al. ............. 705/37 |
| 2003/0200167 | A1 * | 10/2003 | Kemp et al. ................... 705/37 |
| 2004/0153394 | A1 * | 8/2004 | West et al. .................... 705/37 |
| 2006/0069635 | A1 * | 3/2006 | Ram et al. ..................... 705/37 |

FOREIGN PATENT DOCUMENTS

| | | |
|---|---|---|
| WO | WO 95/26005 | 9/1995 |
| WO | WO 98/49639 | 11/1998 |
| WO | WO 99/19821 | 4/1999 |
| WO | WO 99/30259 | 6/1999 |
| WO | WO 99/53424 | 10/1999 |
| WO | WO 00/52619 | 9/2000 |
| WO | WO 00/62187 | 10/2000 |
| WO | WO 00/65510 | 11/2000 |
| WO | WO 01/16852 | 3/2001 |
| WO | WO 01/22315 | 3/2001 |
| WO | WO 01/16830 | 8/2001 |
| WO | WO 01/88808 | 11/2001 |

OTHER PUBLICATIONS

USPTO Presentation, NASDAQ, Nov. 8, 2001.

* cited by examiner

| SYCOM FGBL DEC99 | | | | | | |
|---|---|---|---|---|---|---|
| E/W | 10:48:44 | | BidQ | AskQ | Prc | LTQ |
| | L | 3 | | 104 | 99 | |
| | R | 5 | | 24 | 98 | |
| | 720 | | | 33 | 97 | |
| | × | 10 | | 115 | 96 | |
| | 0 | | | 32 | 95 | |
| | 10 | 1H | | 27 | 94 | |
| | 50 | 3H | | | | |
| S 0 W 24 | 1K | 5H | | 63 | 93 | |
| S 0 W 7 | CLR | | | 45 | 92 | |
| | × | 10 | | 28 | 91 | |
| | 17 | ▽ | | 20 | 90 | 10 |
| B 0 W 15 | CXL | | 18 | | 89 | |
| B 0 W 13 | + | − | 97 | | 88 | |
| | NET 0 | | 30 | | 87 | |
| B 0 W 17 | NET REAL | | 43 | | 86 | |
| | | | 110 | | 85 | |
| | | | 23 | | 84 | |
| | | | 31 | | 83 | |
| | | | 125 | | 82 | |
| | | | 21 | | 81 | |

Top panel (902):

| SELL | Wrk/Cxl | BUY | |
|---|---|---|---|
| 86775 | | 100 | |
| 86750 | 10 | 10 | |
| | 86725 | | |
| 5 | 5 | 86700 | |
| | | 86675 | |
| 250 | 50 | 86650 | |

| ESH3 | v | 5 | ^ | -10 | <> |

| Symbol | Ask | Bid | Last | ^ |
|---|---|---|---|---|
| ESH3 | 83575 | 83550 | 83575 | |
| GEH3-G | 50.50 | 50 | 51.00 | |
| GEH3 | 9875.50 | | | |
| NQH3 | | | | v |

Action  View  Go  Config

Labels: 906→SELL, 902→Start, 908→Wrk/Cxl, 910→BUY, 928, 912→86775, 914→86750, 930→10, 918→5, 922→86700, 924→86675, 920→250, 926→86650, 916→ESH3

Bottom panel (904):

| Hit | Wrk/Cxl | Take | |
|---|---|---|---|
| 86775 | | 100 | |
| 86750 | 10 | 10 | |
| | 86725 | | |
| 5 | 5 | 86700 | |
| | | 86675 | |
| 250 | 50 | 86650 | v |

| ESH3 | v | 5 | ^ | -10 | <> |

| Symbol | Ask | Bid | Last | ^ |
|---|---|---|---|---|
| ESH3 | 83575 | 83550 | 83575 | |
| GEH3-G | 50.50 | 50 | 51.00 | |
| GEH3 | 9875.50 | | | |
| NQH3 | | | | v |

Action  View  Go  Config

Labels: 930→Start, 932→Take, 934, 936, 942→86775, 938→5, 940→250

TRADER STATION USER INTERFACE

This application relates to and claims priority from U.S. Provisional Application serial No. 60/474,035, filed May 29, 2003, the entire disclosure of which is hereby incorporated by reference.

FIELD OF THE INVENTION

The present invention relates to the electronic trading of financial instruments. More particularly, the invention relates to user interfaces that display information to a user on a display of a PDA, computer or other device.

DESCRIPTION OF THE RELATED ART

It is common for exchanges to allow traders to conduct transactions with handheld devices and larger computer devices. Attempts have been made to present rapidly changing information to traders in a form that allows the traders to quickly absorb and act on the information.

Figure 1:
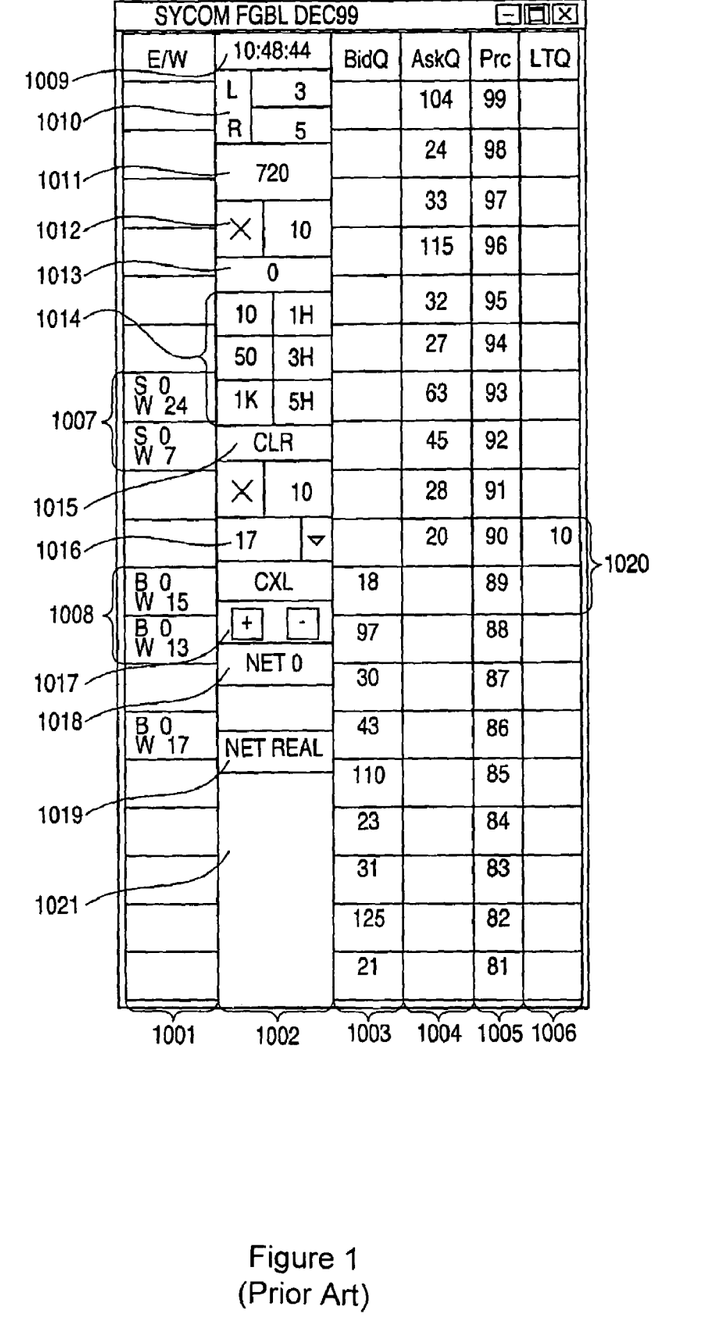
FIG. 1 shows a prior art trader station user interface.

FIG. 1 shows a prior art user interface disclosed in U.S. Patent Application Publication 2002/0059129. A long static column of price information is included in column 1005. Bid quantities are included in column 1003 and ask quantities are included in column 1004. Bid and ask quantities dynamically change to show current market depth and are located next to an appropriate price. Price column 1005 includes 19 different elements which must be included on a display. One skilled in the art will appreciate that it would be difficult for a trader to read, use and interact with such a user interface when the user interface is displayed on a small screen, such as the screen of a PDA or other portable electronic device. Among other disadvantages, the resulting small characters would be difficult to read.

When using desktop computers or other computer devices having larger displays, user interfaces such as the one shown in FIG. 1 can also be undesirable. Traders often display several windows and wish to limit the amount of space required by any one user interface.

Prior systems have attempted to reduce the area required by a user interface by limiting the amount of information that is displayed at any given time. For example, a fixed number of the most relevant price levels may be displayed. As the market changes, the price levels displayed changes while the number of price levels remains constant. One drawback of these systems is that traders risk placing orders that are different form the orders that they intend to place. For example, a trader may attempt to enter a bid at a certain price level and the user interface may be updated in the process of entering the bid. A region of the user interface corresponding to a first price level may change during the entry of an order and correspond to a second price level before the order is entered.

There is a need in the art for systems and methods that incorporate user interfaces that minimize the area needed for display while maximizing the readability and usability of the user interfaces. There is also a need in the art for systems and methods that incorporate user interfaces that minimize the risk of entering incorrect orders.

SUMMARY OF THE INVENTION

The present invention overcomes at least some of the problems and limitations of the prior art by providing methods and systems that utilize the disclosed user interfaces and display methods. In a first embodiment, a user interface has two display modes, locked and unlocked. In the locked mode, some or all of the data fields such as prices, bids, offers, etc. are locked. In the unlocked mode, all the data fields, including the price column, are dynamically updated. In a second embodiment, a price column is divided such that prices above the market are in a first column and prices below the market are in a second column to reduce the number of columns required to show bids, offers and prices. Optionally, the trader's bids and offers not exposed to the market can be shown in columns adjacent to the market bids and offers. In a third embodiment of the invention orders are cancelled if the market changes within a short period of time before the order is placed and the change does not benefit the user.

In other embodiments, the present invention can be partially or wholly implemented on a computer-readable medium, for example, by storing computer-executable instructions or modules, or by utilizing computer-readable data structures.

Of course, the methods and systems disclosed herein may also include other additional elements, steps, computer-executable instructions, or computer-readable data structures. The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION OF THE INVENTION

Exemplary Operating Environment

Aspects of the present invention are preferably implemented with computer devices and computer networks that allow users to exchange trading information. An exemplary trading network environment for implementing trading systems and methods is shown in FIG. 2.

An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.)

Figure 2:
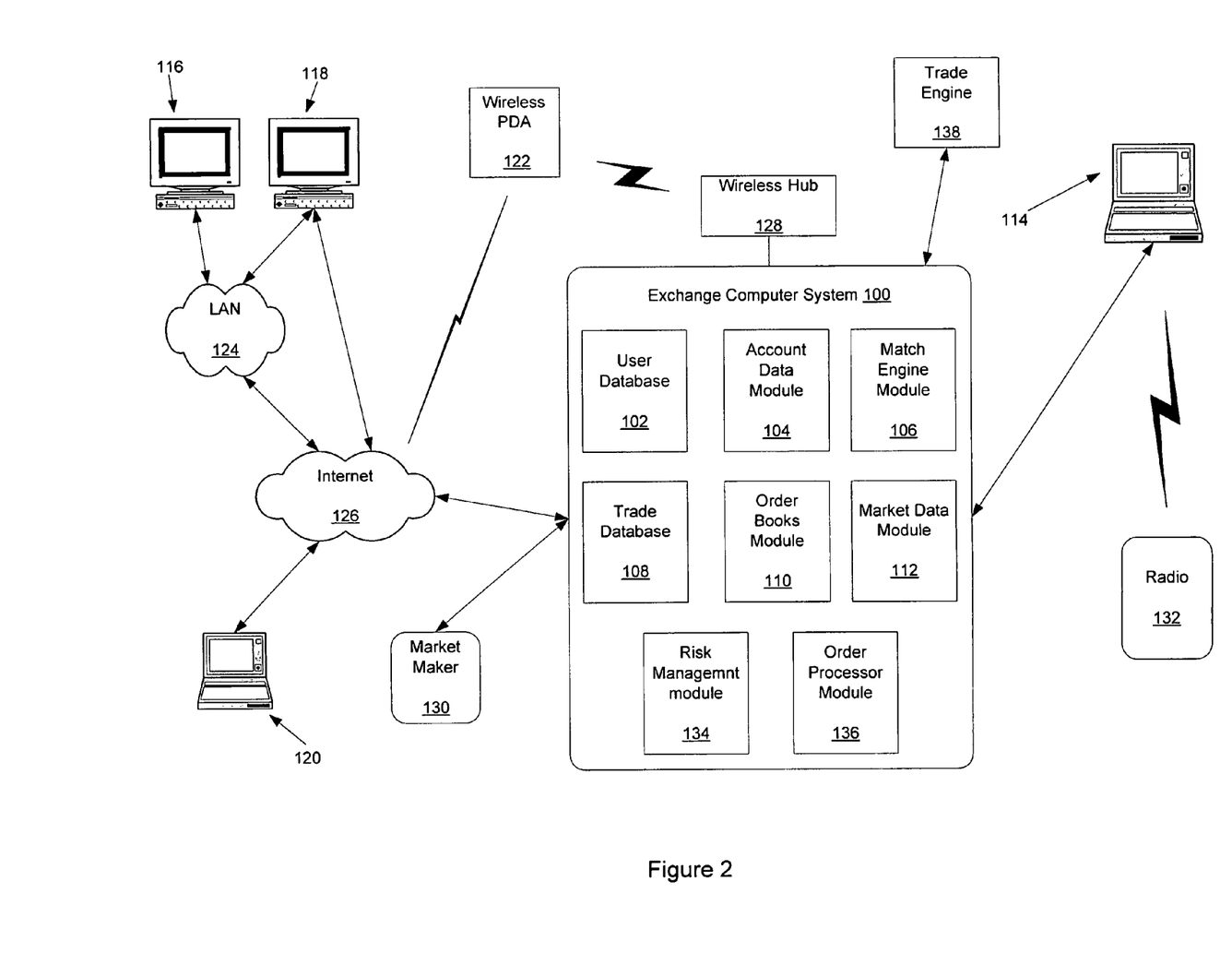
FIG. 2 shows a computer network system that may be used to implement aspects of the present invention.

The trading network environment shown in FIG. 2 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 2 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 2 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, hand-held devices, personal digital assistants, telephones and other devices may also be connected to exchange computer system 100. Moreover, one skilled in the art will appreciate that the topology shown in FIG. 2 is merely an example and that the components shown in FIG. 2 may be connected by numerous alternative topologies.

User Interfaces

Figure 3:
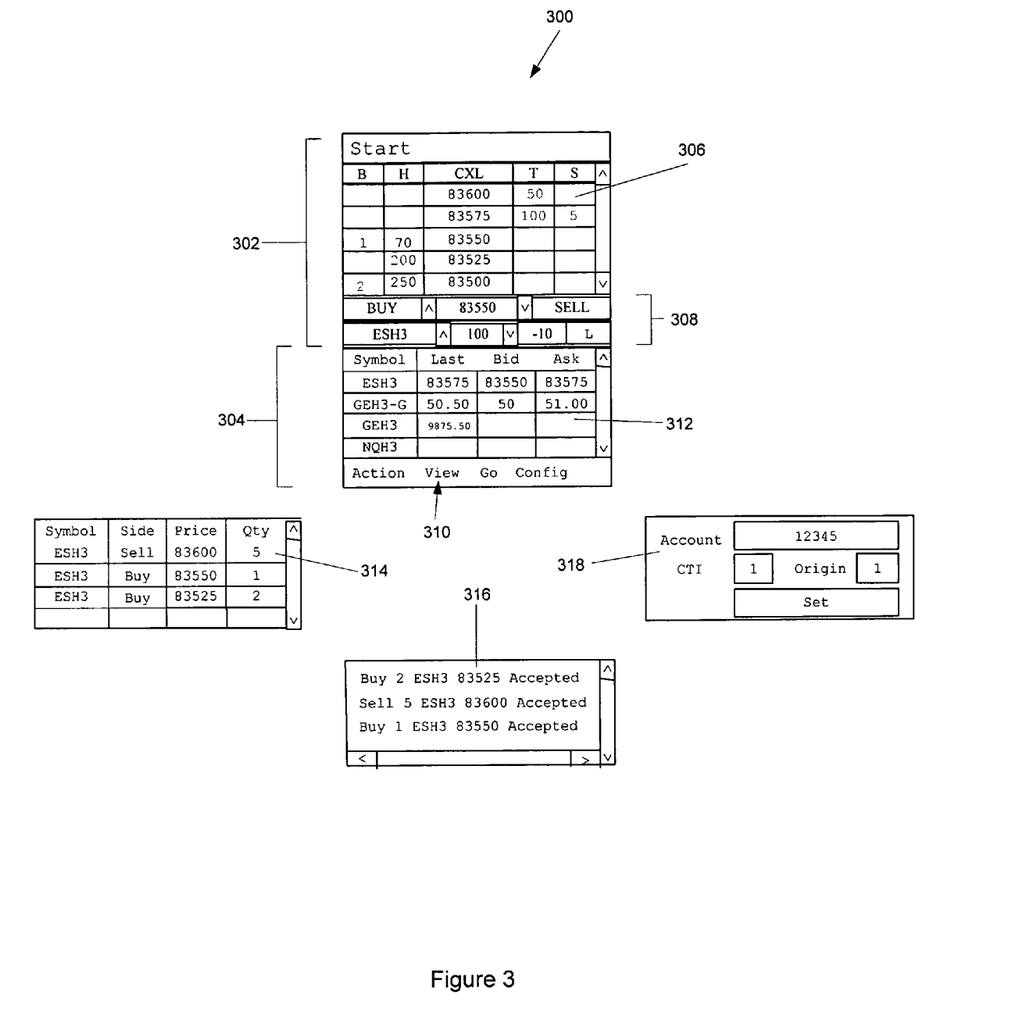
FIG. 3 shows a trader station user interface, in accordance with an embodiment of the invention.

FIG. 3 shows a trader station user interface 300 in accordance with an embodiment of the invention. A new client window is divided into two portions. An order entry region 302 may be included as the top portion of user interface 300 and an informational region 304 may be included as the bottom portion of user interface 300.

Figure 4:
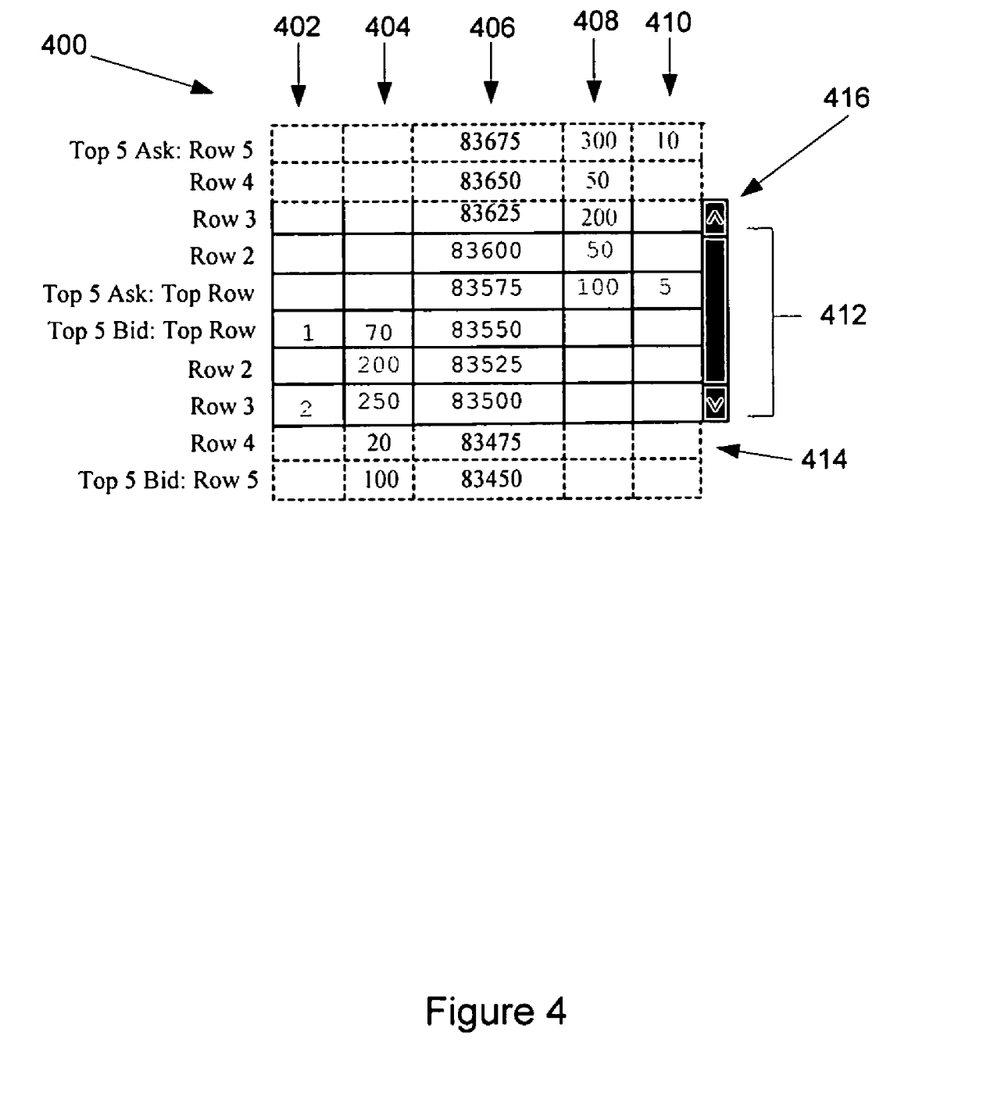
FIG. 4 shows an exemplary price and quantity grid 400, in accordance with an embodiment of the invention.

Order entry region 302 includes a price and quantity grid 306. FIG. 4 shows an exemplary price and quantity grid 400. As shown in the embodiment of FIG. 4, price and quantity grid 400 may contain five columns and ten rows. A buy column 402 displays a user's working buy order quantities. As used herein, a user may be a trader. A hit column 404 displays the market bid quantities. Prices for individual rows are displayed in a price column 406. A take column 408 displays market ask quantities. And, a sell column 410 displays a user's working sell order quantities. Individual entries may be color coded to assist users in quickly interpreting the displayed information. For example, entries in buy column 402 and hit column 404 may be in blue and entries in take column 408 and sell column 410 may be in red.

Price and quantity grid 400 includes more rows than are displayed in price and quantity grid 306 (shown in FIG. 3). Section 412 includes the rows from price and quantity grid 400 that are included in price and quantity grid 306. The information included in rows outside of section 412, such as the information included in row 414, may be stored in memory and retrieved when needed. A scroll bar 416 allows a user to select which group of rows to display in price and quantity grid 306.

Figure 5:
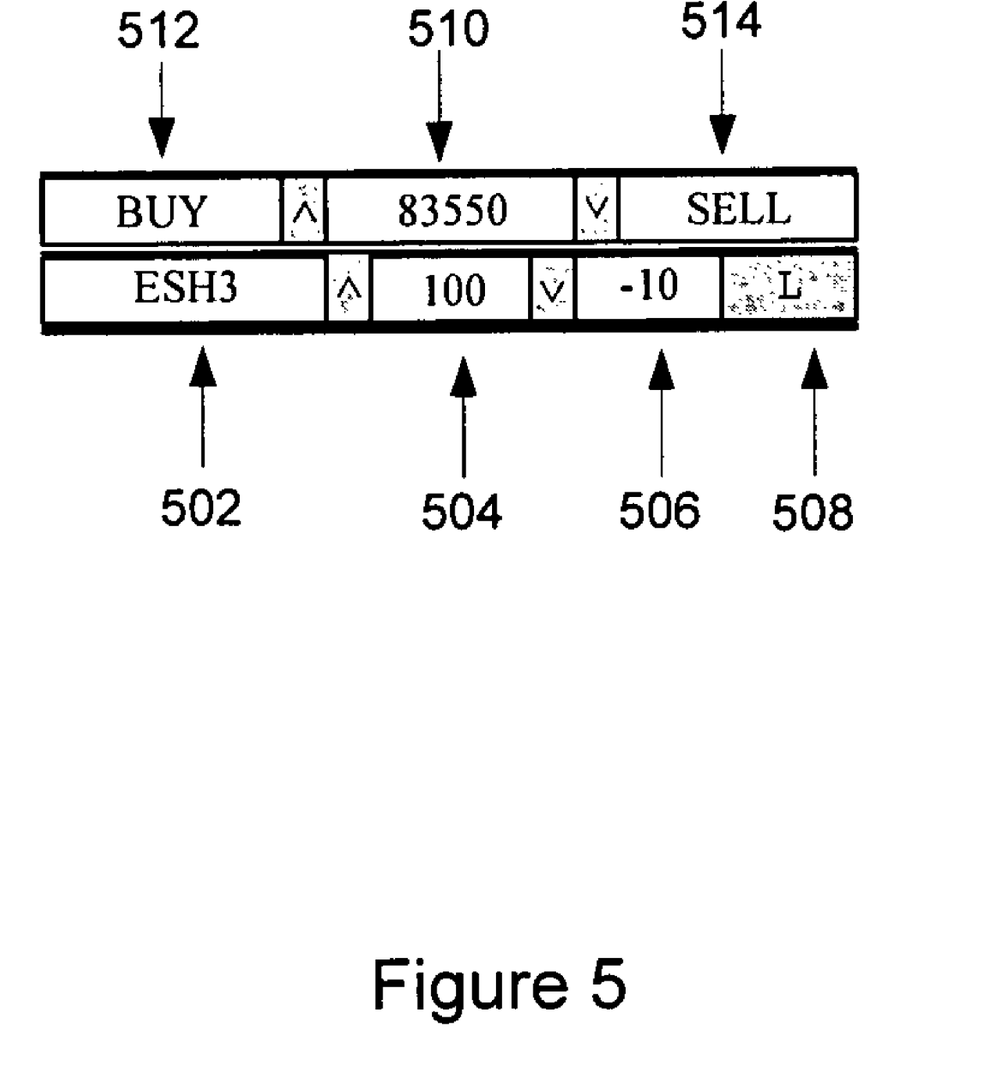
FIG. 5 illustrates a custom order entry region, in accordance with an embodiment of the invention.

Order entry region 302 may also include a custom order entry region 308. FIG. 5 illustrates a custom order entry region in accordance with an embodiment of the invention. A contract field 502 identifies a particular contract the user wishes to buy or sell. A quantity field 504 identifies the number of contracts the user wishes to buy or sell. A user can adjust the quantity by selecting the increase or decrease scroll icons. Alternatively, the user can edit the displayed text. Scroll icons are particularly convenient for small handheld devices that may not include a keyboard or that include a keyboard with small keys. The user's net position for the contract display in contract field 502 is displayed in net position field 506.

A lock icon 508 may be included to lock the state of price and quantity grid 306. The operation of lock icon 508 is described in detail below. The price of the transaction is displayed in a price field 510. In one embodiment of the invention, selecting contract field 502 causes price field 510 to display the most recent market price for that contract. The user can adjust the price by selecting the increase or decrease scroll icons. Alternatively, the user can edit the displayed text. Finally, the user may select either a buy icon 512 or a sell icon 514 to enter a buy or sell order.

Returning again to FIG. 3, a view icon 310 may be used to select the type of information to display in informational region 304. In one embodiment of the invention, informational region 304 may contain several overlaid informational panels. Selecting view icon 310 may cause a menu of informational panels to be displayed. Alternatively, selecting view icon 310 may cause informational region 304 to toggle through the informational panels.

Informational panels may include a variety of different trading related information. Informational panel 312 displays market activities of several contracts simultaneously. Informational panel 314 may display some or all of a user's working orders. In one embodiment of the invention, a user may cancel a working order by selecting the order in informational panel 314. An informational panel may also serve as a message log. Informational panel 316, for example, includes trade related messages received from a trading match engine. Clearing information may also be displayed in an informational panel. Informational panel 318 displays a user's current clearing information settings and allows the user to make modifications. One skilled in the art will appreciated that two or more of the disclosed informational panels may be combined and additional informational panels may be used without departing from the scope of the invention.

Aspects of the present invention support a variety of different orders, such as buy/sell limit day order and buy/sell fill and kill limit day order. Orders may be for financial instruments such as options contracts, futures contracts, options on futures contracts, securities, etc.

The information included in price and quantity grid 306 may change while the market moves. An element within the grid may represent one transaction at a first time and a second transaction a split second later. With prior user interfaces, the user risked sending an unwanted order or cancel request to a trade engine. With the present invention, lock icon 508 may be used to freeze the state of the user interface to prevent elements of price and quantity grid from changing while the user enters a trade. Once clicked, price and quantity grid 306 will only be updated in the memory of the device, and there is no display update. As a result and as described in detail below, selecting an element within price and quantity grid 306 will send out an order or cancel request that the user intended. In one embodiment, soon after the request is sent, the lock will be released automatically. The lock can also be released by clicking lock icon 508 again without sending out any order request. In one alternative embodiment, lock icon 508 may be replaced with a button or other physical device that forms part of a computer device.

Of course there are numerous alternatives for releasing the lock, such as releasing after the order is entered, after a time defined by the user, etc. In another embodiment, only a portion of price and quantity grid 306 is locked, such as the portion that the user is using to enter an order or the price column. The user may be presented with options for selecting the criteria for locking and unlocking. For example, a lock icon may be placed next to each column and/or row to allow the user to select columns and rows to lock.

Figure 6:
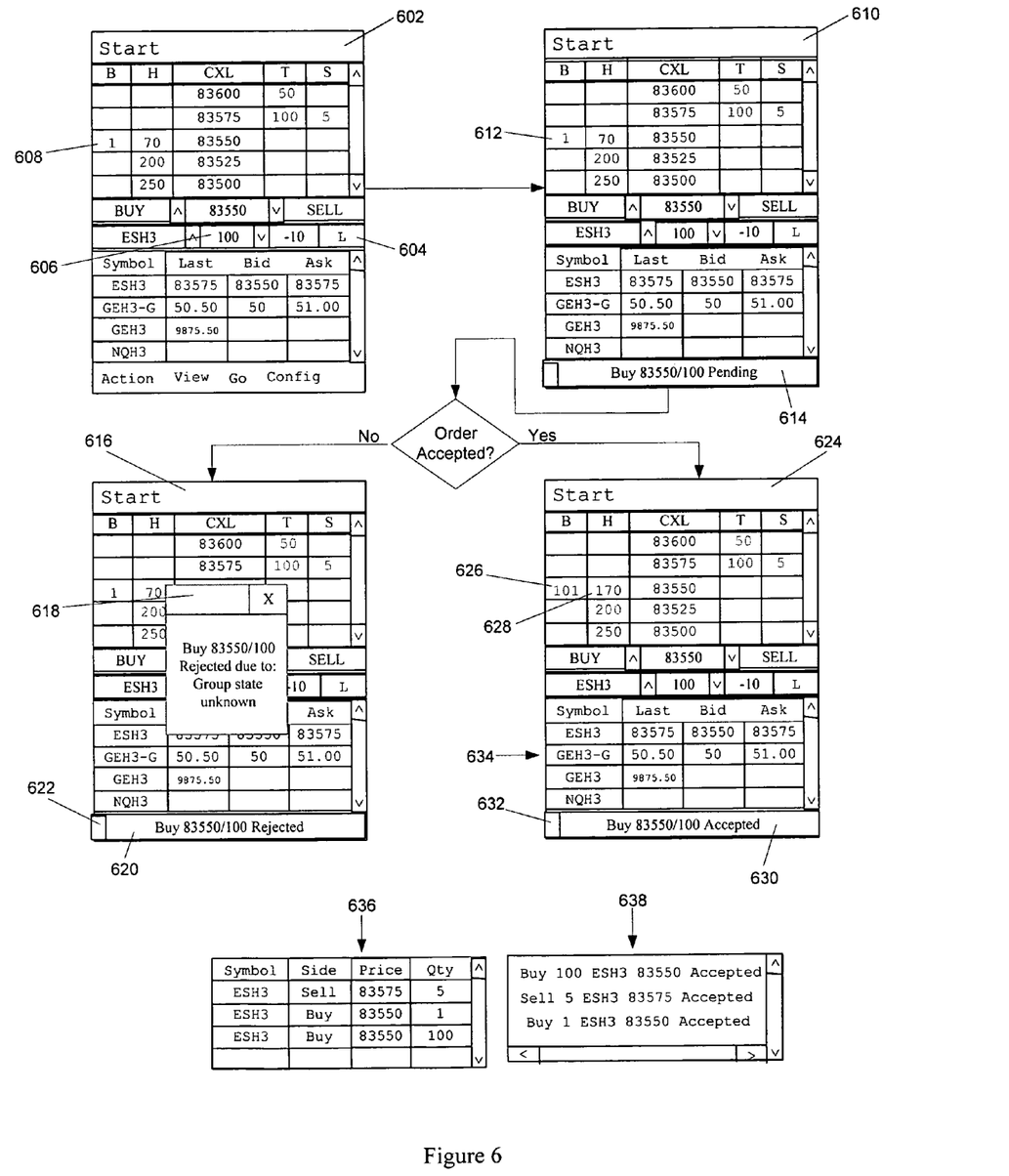
FIG. 6 illustrates an embodiment that includes an order entry for a buy and sell limit day orders, in accordance with an embodiment of the invention.

FIG. 6 illustrates an embodiment that includes an order entry section for buy and sell limit day orders. User interface 602 illustrates a state before the entry of an order. User interface 602 may be presented on the display of a computer device, such as a PDA. In the example shown in FIG. 6, the user wishes to buy 100 ESH3 contracts at 83550. In order to ensure that user interface 602 does not change while the user is in the process of entering an order, the user may first select lock icon 604. After lock icon 604 is selected, updated market information is stored locally, but not presented on the display. Next, the user sets a quantity field 606 to 100 (the number of contracts the user wishes to buy). Element 608 is then selected to enter the order. Element 608 may be selected with a stylus, key pad, mouse or any other conventional mechanism for selecting elements of a graphical user interface. Selecting any element in the left most column will send in a limit GTD buy order with the price specified in the center column and the quantity specified in quantity field 606. Similarly, selecting any element in the right most column will send in a limit GTD sell order with the price specified in the center column and the quantity specified in quantity filed 606.

After element 608 is selected, a buy order for 100 ESH3 contracts at 83550 may be transmitted to a match engine. After the order is entered, the lock may be released automatically so that updated market information is displayed. User interface 610 illustrates a state that exists while an order is pending. The background color of element 612 may be changed to indicate that the order is pending. Of course other visual aspects of element 612 and/or visual aspects of the surrounding elements may be changed to indicate that the order is pending. A message banner 614 may also include a message indicating that an order is pending. The background color of message banner 614 may be changed to indicate that an order is pending. In one embodiment of the invention, the background color of element 612 and message banner 614 is changed to green to indicate that an order is pending.

Next, it is determined whether or not the order was accepted. User interface 616 illustrates a state that exists when an order has been rejected. A dialog box 618 may be presented to indicate that the order was rejected and may also provide a reason for the rejection. A message banner 620 may also indicate that the order was rejected. In one embodiment, the background color of message banner 620 is changed to a color that is different from the background color of message banner 614, such as yellow. Region 622 may be selected to close message banner 620.

User interface 624 illustrates a state that exists when an order has been accepted. Element 626 has been updated to show that the user has entered an order for 100 additional contracts. Similarly, element 628 has been updated to reflect the order. The background color of element 626 may also be switched to the default color. A message banner 630 may indicate that the order was accepted. In one embodiment, the background color of message banner 630 is changed to a color that is different from the background colors of message banners 614, and 620, such as blue. Region 632 may be selected to close message banner 630. Informational panels 634, 636 and 638 are exemplary informational panels that may be displayed after an order is accepted.

Figure 7:
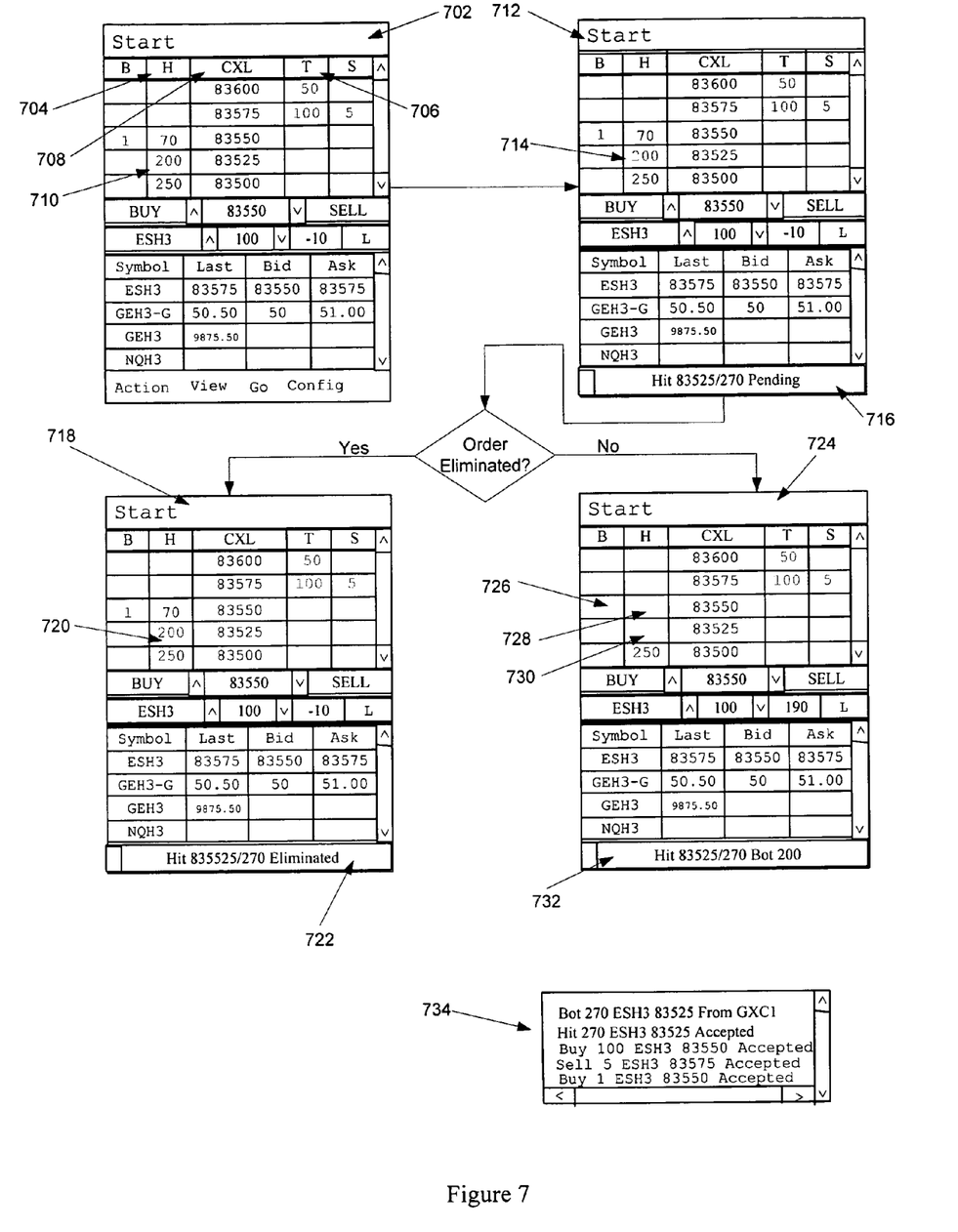
FIG. 7 illustrates an embodiment of the invention that may be used for order entry for hit and take orders, in accordance with an embodiment of the invention.

FIG. 7 illustrates an embodiment of the invention that may be used for order entry for hit and take orders. User interface 702 illustrates a state before the entry of an order. Column 704 is a hit column that includes market bid quantities and column 706 is a take column that includes market ask quantities. Selecting any element in hit column 704 will send in a limit fill and kill buy (HIT) order with the price specified in price column 708 and the quantity equal to all available market quantity. Similarly, selecting any element in take column 706 will send in a limit fill and kill sell (TAKE) order with the price specified in price column the center column and the quantity equal to all available market quantity.

In the example shown, a user may send a fill and kill limit order for 270 ESH3 contracts at 83525 by selecting element 710. After element 710 is selected, the order may be sent to a match engine. User interface 712 illustrates a state while the order is pending. The background color of element 714 may be changed to indicate that the order is pending. Of course other visual aspects of element 714 and/or visual aspects of the surrounding elements may be changed to indicate that the order is pending. A message banner 716 may also include a message indicating that an order is pending. The background color of message banner 716 may be changed to indicate that an order is pending. In one embodiment of the invention, the background color of element 714 and message banner 716 is changed to green to indicate that an order is pending.

Next, it is determined whether or not a match engine has eliminated the order. User interface 718 illustrates a state that exists when an order has been eliminated. The background color of element 720 returns to the same color as the background of element 710. A message banner 722 may indicate that the order has been eliminated. The background color of message banner 722 may be changed to indicate that the order has been eliminated. In one embodiment the color is changed to yellow. A dialog box may also be displayed to indicate that the order has been eliminated and may also provide a reason for the elimination.

User interface 724 illustrates a state when the order has been accepted. The values in elements 726, 728 and 730 are reset to reflect the change in net positions and to indicate that the order has been accepted. A message banner 732 may be included to indicate that the order has been accepted. The color of message banner 732 may also be changed to a different color, such as blue. Informational panel 734 is an exemplary informational panel that may be displayed after an order has been accepted.

Figure 8:
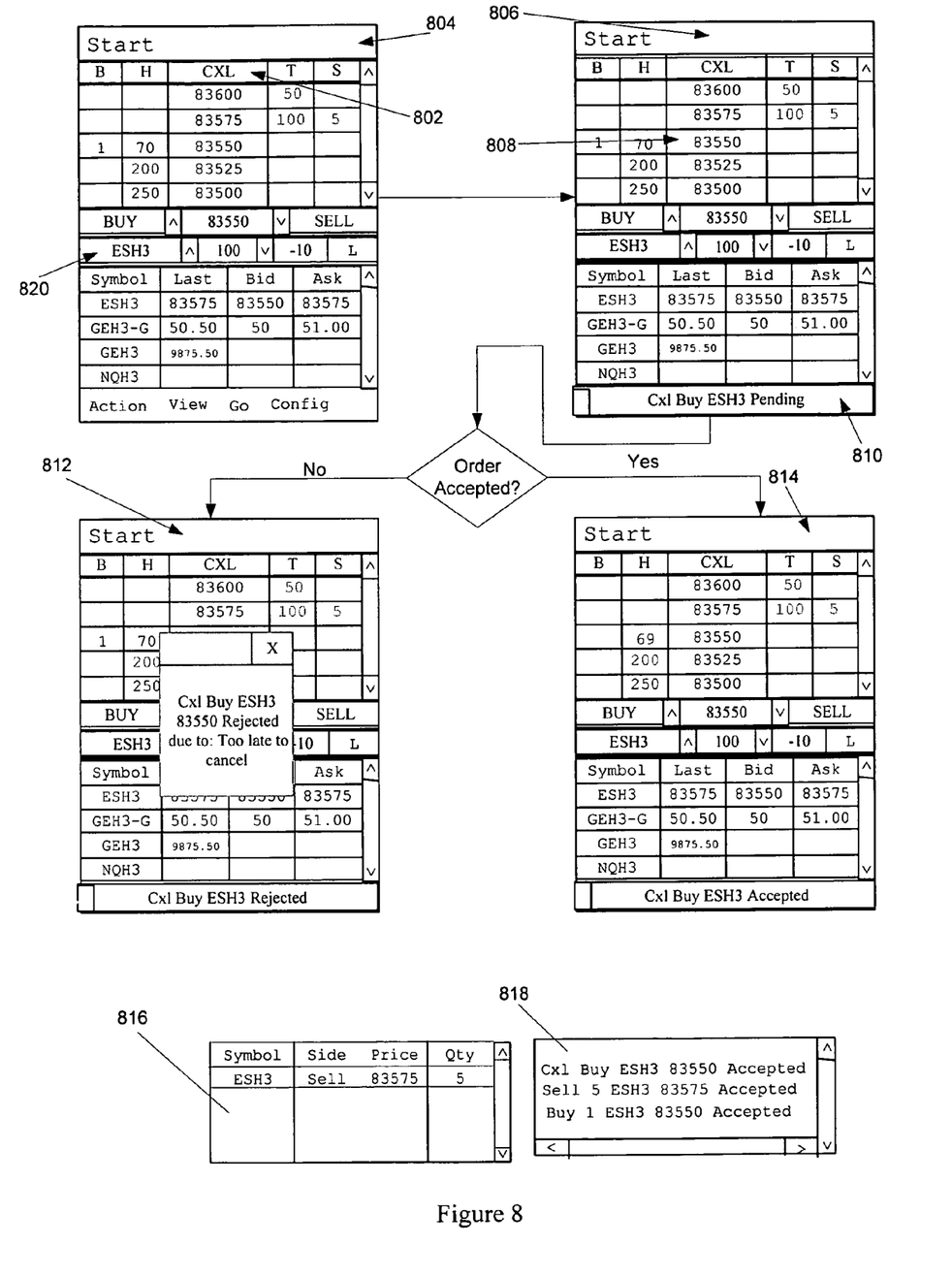
FIG. 8 illustrates user interfaces that may be used to cancel working orders, in accordance with an embodiment of the invention.

FIG. 8 illustrates user interfaces that may be used to cancel working orders, in accordance with an embodiment of the invention. Selecting a price element in price column 802 of user interface 804 will send a cancel request to a match engine to cancel all working orders at that price. User interface 806 illustrates a state that exists when the user selects element 808. The background color or other visual characteristic of element 808 may be changed to indicate that a cancel order is pending. A message banner 810 may also include a message indicating that an order is pending. The background color of message banner 810 may be changed to indicate that an order is pending. In one embodiment of the invention, the background color of element 808 and message banner 810 is changed to green to indicate that an order is pending.

It is next determined whether the order is accepted. User interface 812 illustrates a state that exists when an order has not been accepted. User interface 814 illustrates a state that exists when an order has been accepted. User interfaces 812 and 814 are similar to user interfaces 616 and 624 (shown in FIG. 6) respectively, and a description is not repeated here. Informational panels 816 and 818 are exemplary informational panels that may be displayed after an order is accepted.

In one embodiment of the invention, a single command may be used to cancel all of a user's orders for a specific contract or all orders for all contracts. For example, selecting the column heading for column 802 may cancel all orders for the contracts identified in element 820.

A confirmation box option may be used to protect against unwanted trades. Activating and deactivating the confirmation box may be accomplished by making an appropriate menu selection. Once the confirmation box is turned on, every trade will be echoed in the confirmation box to ask for further approval. If the user approves the order, the order request may be sent to a match engine. If cancelled, nothing will be sent to the match engine.

A user can limit his or her one-time trading quantity to a fixed maximum number. This will protect user from hitting or taking an unwanted large market quantity or an erroneous quantity specification. If the quantity in any order request exceeds this number, a message box will be popped up to warn user, and the request will not be sent to the host. The determination of whether a trading quantity exceeds a fixed maximum number may be made locally and/or at a match engine.

Figure 9:
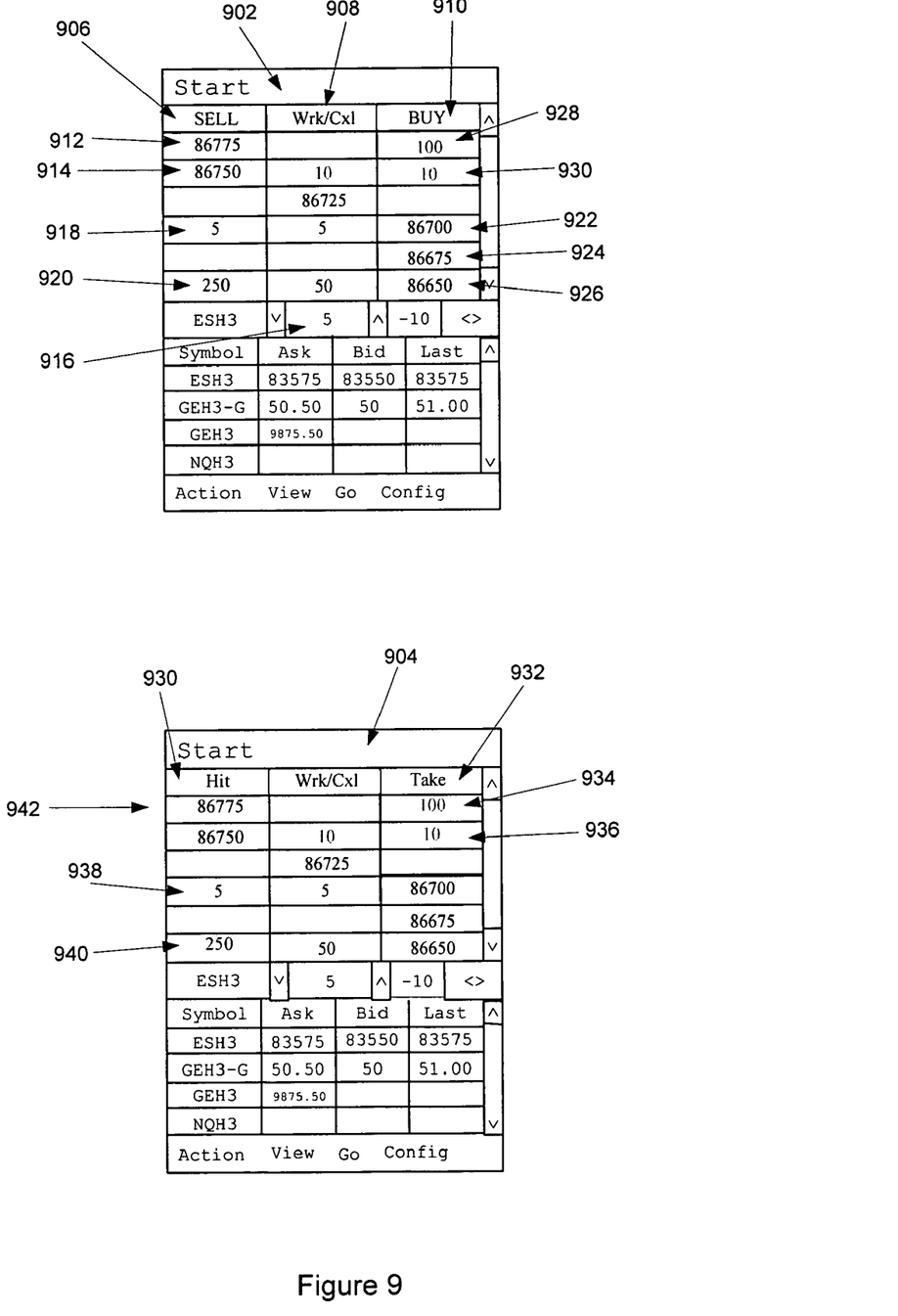
FIG. 9 illustrates alternative user interfaces that include 3 columns, in accordance with an embodiment of the invention.

FIG. 9 illustrate alternative user interfaces 902 and 904 in accordance with an embodiment of the invention. User interfaces 902 and 904 preferably include only 3 columns. Of course, the information included in the three columns may also be arranged in 3 rows. Among other advantages, the use of only three rows or columns eliminates unused space and improves readability on a small display or section of a display.

User interface 902 includes a first column 906 that may include ask prices and market bid quantities. A second column 908 may include the user's working bid and ask quantities. A third column 910 may include bid prices and market ask quantities.

In operation, selecting element 912 or 914 will transmit a sell order having the price indicated and the quantity listed in element 916. Selecting element 918 or 920 will transmit a sell order for the indicated quantity that will be matched at entry with existing buy limit orders and the best available buy price. Selecting element 922, 924 or 926 will transmit a buy order having the price indicated and the quantity listed in element 916. Selecting element 928 or 930 will transmit a buy order for the indicated quantity that will be matched at entry with existing sell limit orders and the best available price. User interface 902 may incorporate the color schemes and functionality of user interfaces described above.

One skilled in the art will appreciate that numerous modifications to user interface 902 may be made while still utilizing 3 columns. User interface 904, for example, replaces sell column 906 and buy column 910 of user interface 902 with a hit column 930 and a take column 932. In one exemplary embodiment, a user may take the market for the indicated quantity by selecting element 934 or 936. The user may hit the market for the indicated quantity by selecting element 938 or 940. Additional modifications may include allowing a user to transmit an order by selecting any element within a row. For example, with reference to user interface 904, a user may transmit a take order for 100 contracts by selecting any element within row 942.

Figure 10:
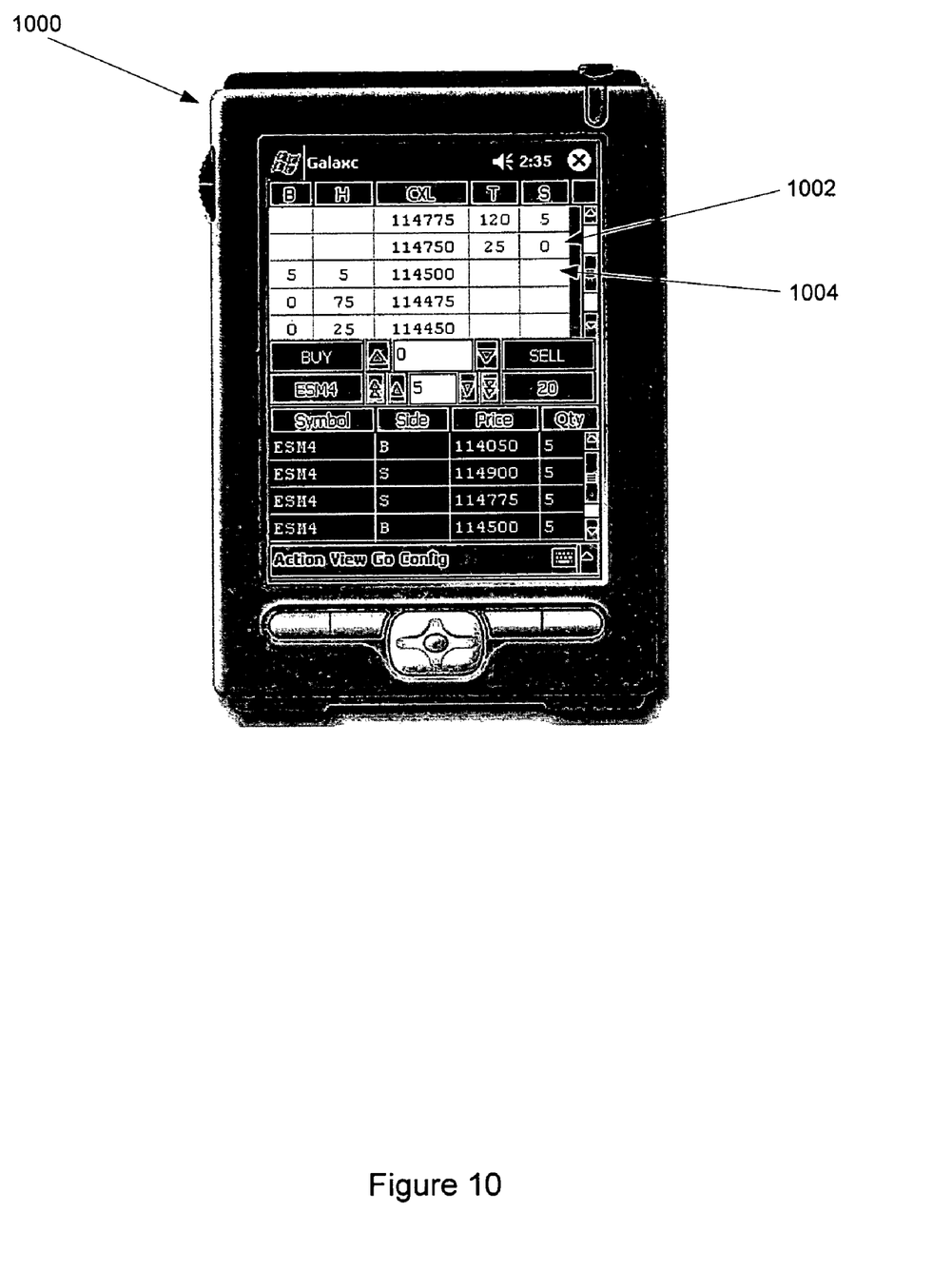
FIG. 10 illustrates a mobile computer device that includes a graphical user interface that does not include a lock icon, in accordance with another embodiment of the invention.

FIG. 10 illustrates a mobile computer device 1000 that includes a graphical user interface that does not include a lock icon in accordance with another embodiment of the invention. Mobile computer device 1000 may be configured to monitor changes in market depth and cancel orders in which the market price has changed within a short period of time before the user enters the order. In one embodiment of the invention, this price protection feature may be applied to only a portion of a price and quantity grid. For example, the price protection feature may be applied to only rows 1002 and 1004.

Figure 11:
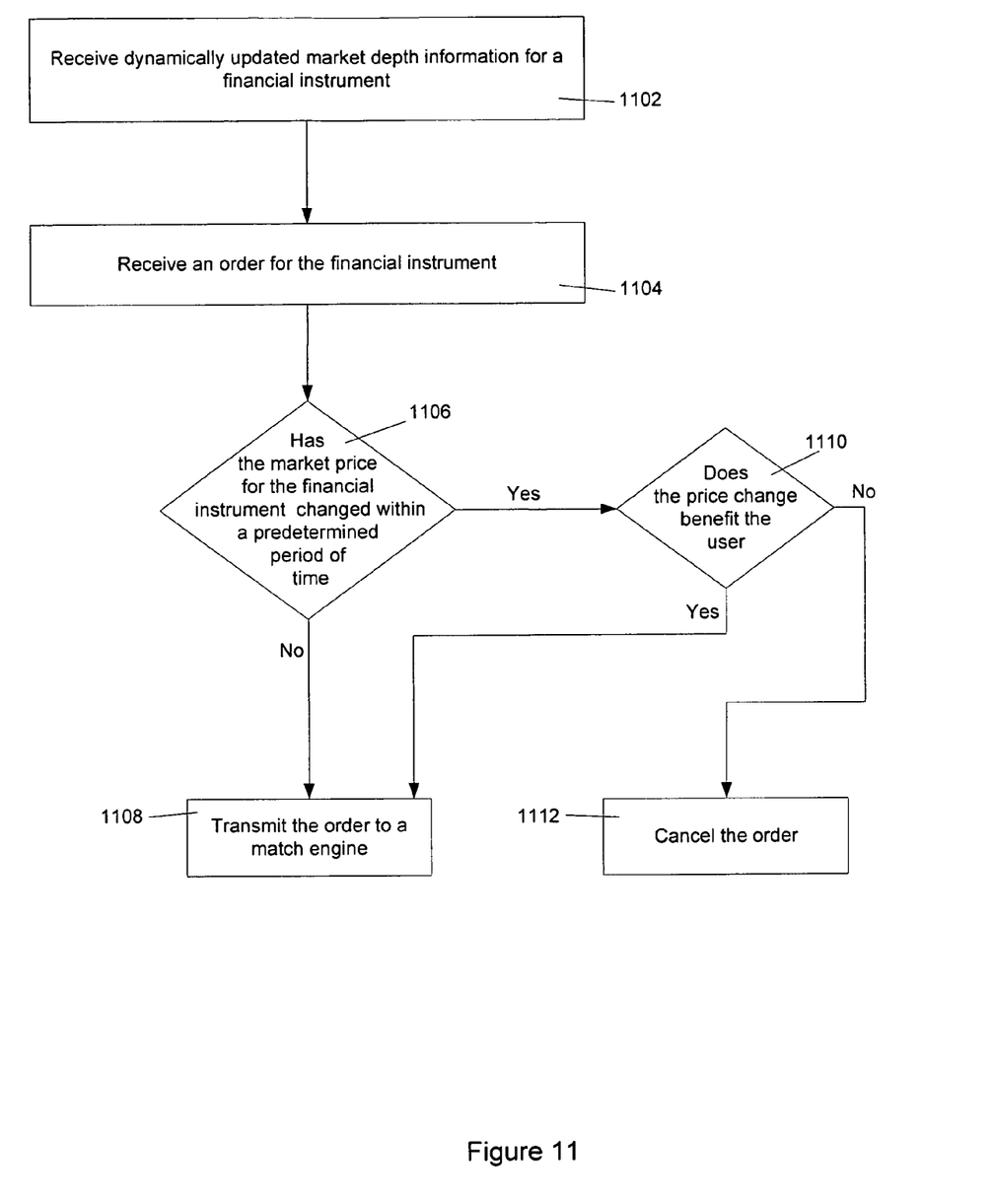
FIG. 11 illustrates an algorithm that may be performed by a mobile computer device to protect a user against unexpected changes in prices, in accordance with another embodiment of the invention.

FIG. 11 illustrates an algorithm that may be performed by mobile computer device 1000 to protect a user against unexpected changes in prices. First, in step 1102 mobile computer device 1000 receives dynamically updated market depth information for a financial instrument. Next, mobile computer device 1000 receives an order for the financial instrument from a user in step 1104. Step 1104 may result from, for example, the user providing a selection command to the graphical user interface. In step 1106 it is determined whether the market price for the financial instrument has changed within a predetermined period of time before receiving the order from the user. For example, it may be determined whether the price has changed within a two second period of time that begins two seconds before receiving the order and ends at the point that the order was received. In an alternative embodiment, a default tick tolerance or user specified tick tolerance is used and step 1106 includes determining whether the market price has changed a predetermined amount.

If the price has not changed within the predetermined time period, the order may be transmitted to a match engine in step 1108. In alternative embodiments of the invention step 1108 may be replaced with one or more other steps that result in an order being conveyed from the mobile terminal to a destination that will ultimately result in the order being placed with an exchange.

When the price has changed within the predetermined time period, in step 1110 it is determined whether the price change benefits the user. When the price change benefits the user, the order is transmitted to a match engine in step 1108. When the price change does not benefit the user, the order is canceled in step 1112. As used herein, an order is canceled when it is deleted or otherwise does leave mobile computer device 1000 so that the order may be executed at an exchange.

Figure 12:
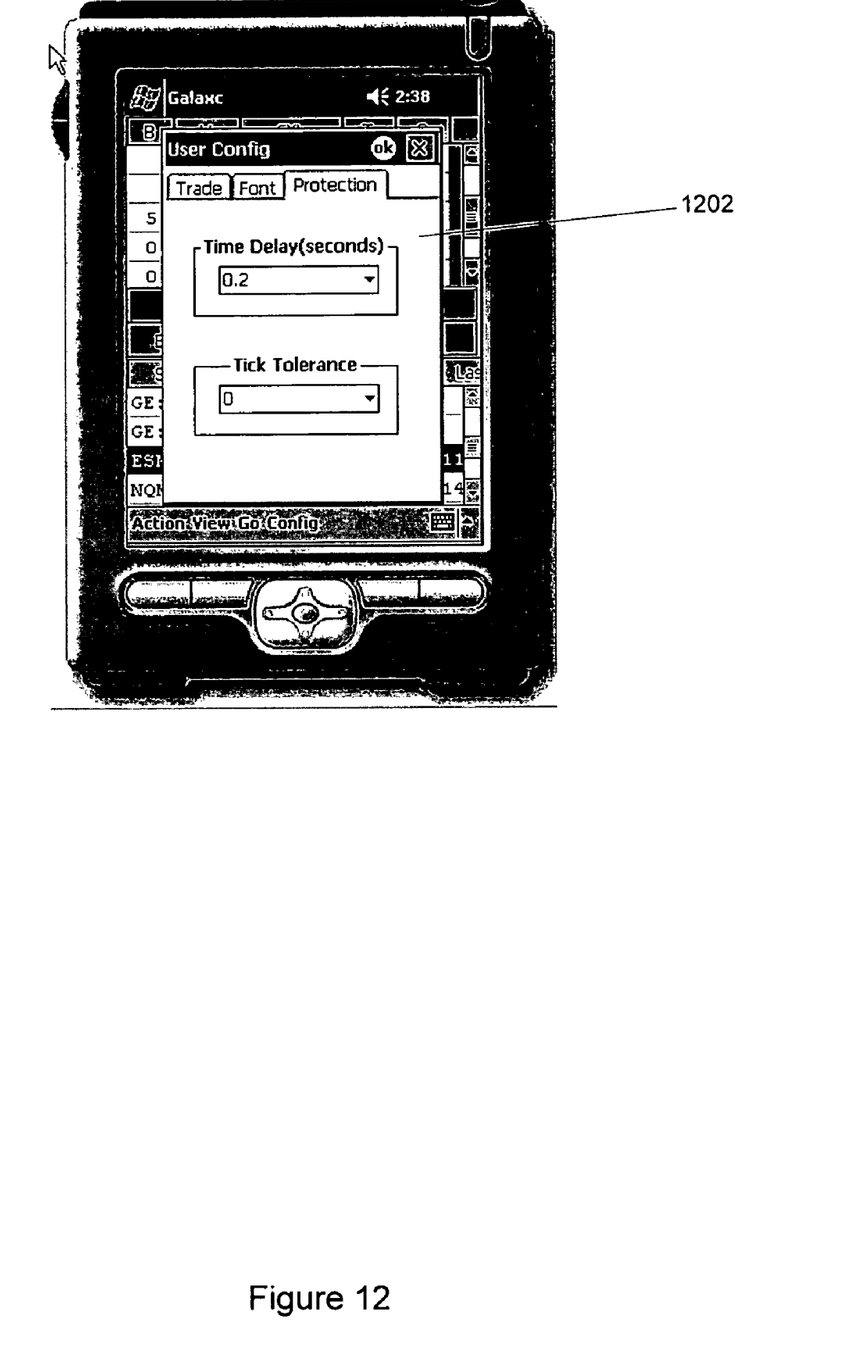
FIG. 12 shows a mobile computer device having an exemplary graphical user interface that allows a user to specify a predetermined time period as well as a tick tolerance used to determine whether to cancel orders, in accordance with an embodiment of the invention.

In various embodiments of the invention, users are allowed to select the predetermined time period and/or tick tolerance. FIG. 12 shows a mobile computer device having an exemplary graphical user interface that allows a user to specify the predetermined time period as well as the tick tolerance. In alternative embodiments of the invention a plurality of predetermined time periods and/or tick tolerance may be used. For example, a first time period may be assigned for orders exceeding a monetary or quantity threshold and a second time period may be assigned for orders that do not exceed the threshold. The predetermined time periods and/or tick tolerances may also be specific to individual or groups of financial instruments.

Various aspects if the invention may include additional mechanisms to prevent unwanted trades. For example, a confirmation box may be activated to present a dialog box to users and request final approval before transmitting a trade. A user can also limit his or her one-time trading quantity to a fixed maximum number. This will protect the user from hitting or taking an unwanted large market quantity or an erroneous quantity specification. If the quantity in any order request exceeds this number, a message box will be popped up to warn the user and the request will not be sent to the host. The determination of whether a trading quantity exceeds a fixed maximum number may be made locally and/or at a match engine.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. All are considered within the sphere, spirit, and scope of the invention.

The invention claimed is:

1. A computer implemented method of processing an order for a financial instrument, the method comprising:
  (a) receiving at a mobile computer device dynamically updated market depth information for a financial instrument;
  (b) receiving a selection command at a graphical user interface of the mobile computer device corresponding to an order for the financial instrument;
  (c) determining at the mobile computer device whether the market price for the financial instrument has changed within a predetermined period of time before (b) until (b);
  (d) when the price in (c) has changed within the predetermined period of time, transmitting the order from the mobile computer device to a match engine only when the price change benefits the user; and
  (e) when the price in (c) has changed within the predetermined period of time, canceling the order when the price change does not benefit the user.

2. The method of claim 1, wherein the order transmitted in (d) is for a price that is lower than the price received in (b).

3. The method of claim 1, wherein the mobile computer device comprises a handheld mobile terminal.

4. The method of claim 1, wherein the financial instrument comprises an options contract.

5. The method of claim 1, wherein the financial instrument comprises a futures contract.

6. The method of claim 1, further including receiving from the user the predetermined time period.

7. The method of claim 1, wherein the predetermined time period is selected for use when ordering one or more financial instruments identified by the user.

8. The method of claim 1, wherein the predetermined time period is selected for use with orders that exceed a predetermined dollar amount.

9. The method of claim 1, wherein the predetermined time period is selected for use with orders that involve a predetermined number of contracts.

10. The method of claim 1, wherein (c) comprises determining whether the market price for the financial instrument has changed at least a predetermined amount within the predetermined period of time.

* * * * *